United States Patent [19]
Smith

[11] Patent Number: 6,142,519
[45] Date of Patent: Nov. 7, 2000

[54] INFLATION ASSEMBLY

[75] Inventor: Bradley W. Smith, Ogden, Utah

[73] Assignee: Autoliv ASP, Inc., Ogden, Utah

[21] Appl. No.: 09/388,399

[22] Filed: Sep. 1, 1999

[51] Int. Cl.⁷ ................................................. B60R 21/26
[52] U.S. Cl. ............................................ 280/741; 280/231
[58] Field of Search .................................... 280/741, 731, 280/732

[56] References Cited

U.S. PATENT DOCUMENTS

| | | | |
|---|---|---|---|
| 3,724,870 | 4/1973 | Kurokawa et al. . | |
| 3,768,824 | 10/1973 | Kloppe et al. . | |
| 3,773,352 | 11/1973 | Radke . | |
| 3,787,074 | 1/1974 | Lewis et al. . | |
| 4,136,894 | 1/1979 | Ono et al. ................................. | 280/729 |
| 4,275,901 | 6/1981 | Okada ..................................... | 280/741 |
| 4,919,897 | 4/1990 | Bender et al. ........................... | 422/165 |
| 4,950,458 | 8/1990 | Cunningham ........................... | 422/164 |
| 5,033,390 | 7/1991 | Minert et al. ............................ | 102/530 |
| 5,058,921 | 10/1991 | Cuevas ................................... | 280/741 |
| 5,286,054 | 2/1994 | Cuevas ................................... | 280/738 |
| 5,348,344 | 9/1994 | Blumenthal et al. ................... | 280/737 |
| 5,593,180 | 1/1997 | Cuevas et al. .......................... | 280/741 |
| 5,630,619 | 5/1997 | Buchanan et al. ..................... | 280/741 |
| 5,658,010 | 8/1997 | Steffens, Jr. et al. .................. | 280/731 |
| 5,685,558 | 11/1997 | Cuevas ................................... | 280/728.2 |
| 5,709,406 | 1/1998 | Buchanan .............................. | 280/741 |
| 5,799,973 | 9/1998 | Bauer et al. ........................... | 280/741 |
| 5,820,161 | 10/1998 | Svensson ............................... | 280/741 |
| 5,833,264 | 11/1998 | Honda et al. .......................... | 280/741 |
| 5,839,754 | 11/1998 | Schlüter et al. ........................ | 280/736 |
| 5,863,066 | 1/1999 | Blumenthal ............................ | 280/737 |
| 5,934,705 | 8/1999 | Siddiqui et al. ....................... | 280/741 |

*Primary Examiner*—Kenneth R. Rice
*Attorney, Agent, or Firm*—Sally J. Brown

[57] ABSTRACT

An assembly for supplying inflation fluid to an inflatable vehicle occupant restraint is provided which includes at least a first gas-supplying cartridge and a diffuser element having a base and a cap. The base forms at least first and second gas-supplying cartridge accepting sections. The first gas-supplying cartridge accepting section is adapted to accept the first gas-supplying cartridge in first inflation medium communicating relationship. The cap includes a plurality of outlet openings wherethrough inflation fluid can be emitted into fluid communication with the inflatable vehicle occupant restraint.

26 Claims, 6 Drawing Sheets

INFLATION ASSEMBLY

BACKGROUND OF THE INVENTION

This invention relates generally to inflatable passive restraint systems for use in vehicles for restraining the movement of a seated occupant such as in the event of a collision and, more particularly, to improved assemblies for providing an inflation fluid to an associated inflatable vehicle occupant restraint.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint, such as in the form of a cushion or bag, commonly referred to as an "airbag cushion." In practice, airbag cushions are normally housed in an uninflated and folded condition to reduce or minimize space requirements. Typically, upon actuation of the system, such as when the vehicle encounters a sudden deceleration as in the event of a collision, the associated airbag cushion is designed to inflate or expand in a matter of no more than a few milliseconds.

Airbag cushion inflation or expansion is generally effected via an inflation fluid, e.g., a gas, produced or supplied by a device commonly referred to as an "inflator." An airbag cushion is desirably deployed into a location within the vehicle between the occupant and certain parts of the vehicle interior, such as a door, steering wheel, instrument panel or the like, to prevent or avoid the occupant from forcibly striking such part(s) of the vehicle interior.

Various types or forms of passive restraint assemblies have been developed or tailored to provide desired vehicle occupant protection based on either or both the position or placement of the occupant within the vehicle and the direction or nature of the vehicle collision. For example, driver side and passenger side inflatable restraint installations have found wide usage for providing protection to drivers and front seat passengers, respectively, in the event of head-on types of collisions while side impact inflatable restraint installations are typically more directed to vehicle occupant protection in the event of various vehicular impacts inflicted or imposed from directions other than head-on.

Many types of inflator devices have been disclosed in the art for the inflation of airbag inflatable restraints. One type of known inflator device derives inflation gas from a combustible pyrotechnic gas generating material which, upon ignition, generates a quantity of gas sufficient to inflate the airbag. Other common or known types of inflator devices include compressed stored gas inflators and hybrid inflators (e.g., inflators which utilize or rely on a combination of stored compressed gas and combustion of a gas generating material, e.g., a pyrotechnic, to produce or form an inflation gas for an associated airbag cushion).

In view of possibly varying operating conditions and, in turn, possibly varying desired performance characteristics, there is a need and a desire to provide what has been termed a "multistage" or "adaptive" inflation assembly and a corresponding inflatable restraint system. With an adaptive inflation assembly, output parameters such as the quantity, supply, and rate of supply of inflation fluid, for example, can be selectively and appropriately varied dependent on one or more selected operating conditions such as ambient temperature, occupant presence, seat belt usage and rate of deceleration of the motor vehicle, for example.

Various proposed or currently available dual stage inflation assemblies appear based on the principle of packaging together two separate inflator devices. While adaptive assemblies and systems are generally desirable for various applications, such dual stage inflation assemblies typically require the inclusion of additional components as a part of the associated inflator devices, thus undesirably increasing one or more of the size, cost and weight of the inflation assembly. For example, such inflator device combinations commonly include two distinct pressure vessels, two sets of filter or inflation gas treatment components, one for the output of each of the pressure vessels, and two distinct diffusers, again one for the output of each of the pressure vessels. Thus, the providing of an adaptive inflation assembly which will satisfactorily meet the size, cost and weight limitations associated with modern vehicle design, particularly as it pertains to driver side applications, has been difficult.

Those skilled in the art will appreciate that the rate at which gas is produced via the combustion of pyrotechnic materials is generally dependent upon the specific characteristics such as burn rate, density, geometry, combustion pressure and gas conversion percentage associated with the particular pyrotechnic material. In general, due to the commonly large pressure dependency of the burn rate of such pyrotechnic materials, it is preferred or necessary that the pressure within a respective inflator housing be maintained within certain limits in order to achieve optimum combustion operation. Unfortunately, various known multistage inflator designs include a single set of throttling orifices for the control of the pressure associated with the multiple pyrotechnic charges contained therewithin. As a result, such multistage inflation designs are not conducive to design optimization. In particular, multistage inflation assemblies must generally be capable of operating in various manners, dependent on the specifics of the incident or event leading to the actuation thereof. As such incident or event specifics are not known at the time of system design or installation, the exit orifices for such multistage inflation designs are typically not sized for optimum combustion but rather to provide an adequate margin of safety when all charges are deployed simultaneously. Pyrotechnics which are burned at less burned at less than optimum pressure are prone to producing increased proportions of various undesirable species such as carbon monoxide and oxide of nitrogen.

Further, inflatable restraint system designs are typically tailored to correspond to the specific vehicle design in which the system is to be installed. A key variable in the specific design of such systems often involves the specific fashion by which the inflatable restraint system is connected, joined or fastened within a particularly designed vehicle. As will be appreciated, such variability may undesirably complicate the manufacture and production of inflatable restraint systems for differently designed vehicles. For example, common inflatable restraint system designs may require complicated, costly, time-consuming or otherwise undesirable tooling, manufacturing or production changes in order to provide required design specificity for particular vehicle installations.

Thus, there is a need and a demand for an adaptive or multistage inflation assembly which more readily permits the independent throttling of the inflation medium discharged from each of the stages thereof. Further, there is a need and a demand for inflatable restraint system installations which more readily permit either or both design specificity and tailorability without necessitating undesirably complicated, costly or time-consuming tooling, manufacturing or production changes in order to provide required design specificity for particular vehicle installations. In particular, there remains a need and a demand for an adaptive inflation assembly, especially for driver side applications, of simple design and construction and such as may more readily satisfy installation size limitations and vehicle design specificity.

SUMMARY OF THE INVENTION

A general object of the invention is to provide an improved assembly for providing inflation fluid to an inflatable vehicle occupant restraint.

A more specific objective of the invention is to overcome one or more of the problems described above.

The general object of the invention can be attained, at least in part, through an assembly which includes at least a first gas-supplying cartridge having a first preselected cross sectional contour. The first gas-supplying cartridge forms a first chamber for providing a first inflation medium and includes at least one exit orifice wherethrough the first inflation medium can be discharged.

The assembly also includes a diffuser element having a base and a cap. The base forms at least first and second gas-supplying cartridge accepting sections with at least the first gas-supplying cartridge accepting section adapted to accept the first gas-supplying cartridge in first inflation medium communicating relationship. The cap includes a plurality of outlet openings wherethrough inflation fluid can be emitted into fluid communication with the inflatable vehicle occupant restraint.

The assembly also includes means for clamping the first gas-supplying cartridge to the base of the diffuser element.

The prior art generally fails to provide an adaptive or multistage inflation assembly which readily permits the independent throttling of the inflation medium discharged from each of the stages thereof. Further, the prior art generally fails to provide inflation assemblies which readily permit either or both design specificity and tailorability without necessitating undesirably complicated, costly or time-consuming tooling, manufacturing or production changes in order to provide required design specificity for particular vehicle installations. In particular, there remains a need and a demand for an adaptive inflation assembly, especially for driver side applications, of simple design and construction and such as may more readily satisfy installation size limitations and vehicle design specificity.

In accordance with another preferred embodiment, the invention further comprehends such an assembly which includes a first gas-supplying cartridge having a first preselected cross sectional contour and forming a first chamber for providing a first inflation medium and a second gas-supplying cartridge having a second preselected cross sectional contour and forming a second chamber for providing a second inflation medium. Each of the first and second cartridges, respectively, includes at least one exit orifice wherethrough the first and second inflation mediums, respectively, can be discharged.

The assembly further includes a diffuser element having a base, a cap and a cooling chamber therebetween. The base forms at least first and second cartridge accepting sections with the first cartridge accepting section adapted to accept the first cartridge in first inflation medium communicating relationship and the second cartridge accepting section adapted to accept the second cartridge in second inflation medium communicating relationship. The cap includes a plurality of outlet openings wherethrough inflation fluid can be emitted into fluid communication with the inflatable vehicle occupant restraint. The cooling chamber contains a cooling medium adapted to accept heat from the first and second inflation media coming into contact therewith.

The assembly also includes means for clamping the first cartridge adjacent to the diffuser element base first cartridge accepting section and the second cartridge adjacent to the diffuser element base second cartridge accepting section.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved assembly for providing inflation fluid to an inflatable vehicle occupant restraint. More particularly, the invention provides an inflation system and associated module assemblies which more readily permit either or both design specificity and tailorability without necessitating undesirably complicated, costly or time-consuming tooling, manufacturing or production changes in order to provide required design specificity for particular vehicle installations.

The invention is described below with particular reference to a driver side airbag inflation module assembly such as for mounting to a steering wheel for automotive vehicles including vans, pick-up trucks, and particularly automobiles. Those skilled in the art will recognize that the invention also has applicability not only with other types or kinds of vehicles including, for example, airplanes, but also can, if desired, be applied to assemblies typically mounted in other locations. For example, the invention can be applied to passenger side and side impact airbag assemblies. With respect to automotive vehicles, the invention has particular initial perceived utility in installations of driver side airbag module assemblies. In particular and as described in greater detail below, the assemblies of the invention may provide an adaptive inflation assembly, especially for driver side applications, of simple design and construction and such as may more readily satisfy installation size limitations and vehicle design specificity.

Figure 1:
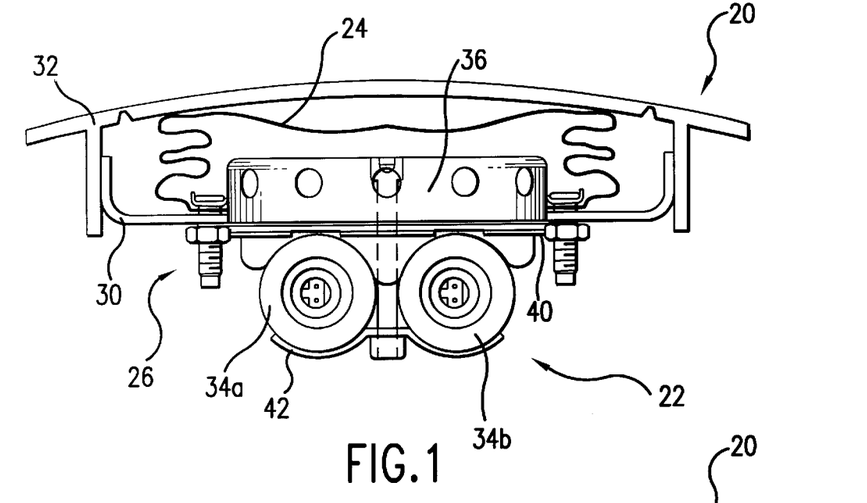
FIG. 1 is an end view, partially in section, of an airbag module assembly in accordance with one preferred embodiment of the invention.
Figure 2:
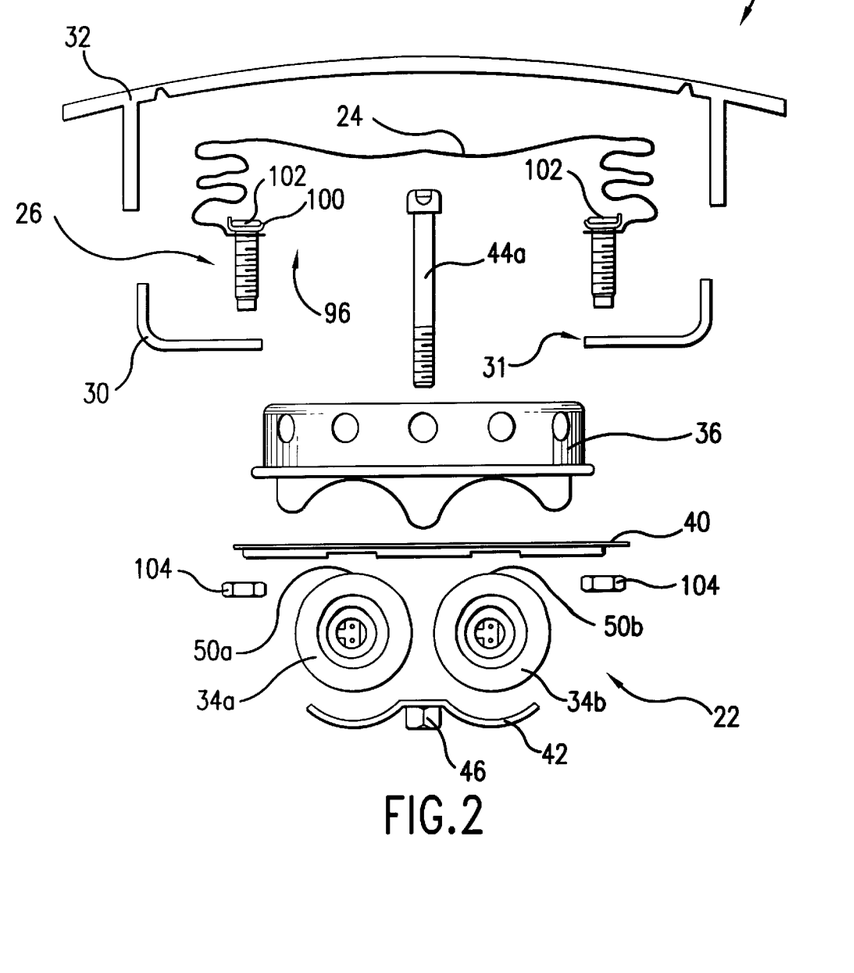
FIG. 2 is a partially exploded end view, partially in section, of the airbag module assembly shown in FIG. 1.

FIGS. 1 and 2 illustrate an airbag module assembly, generally designated by the reference numeral 20, in accordance with one preferred embodiment of the invention. It is to be understood that in the practice of the invention, such an airbag module assembly is commonly housed in or secured to any appropriate cooperating portion of the vehicle. In the case of a driver side module installation, such as illustrated, such an assembly is typically housed in or secured to the steering wheel (not shown).

The module assembly 20 is formed of several major components including an inflation assembly or system, generally designated by the reference numeral 22, such as in accordance with one embodiment of the invention and described in greater detail below with particular reference to FIG. 3. Other major components of the module assembly 20 include an airbag cushion 24, an associated cushion retention system or assembly, generally designated by the reference numeral 26, a module housing 30, having a generally annular base opening 31, and a module cover 32. The module cover 32 can be secured to the module housing 30, such as in a known manner, to enclose the stored airbag cushion 24 prior to actuation of the inflatable restraint system.

Figure 3:
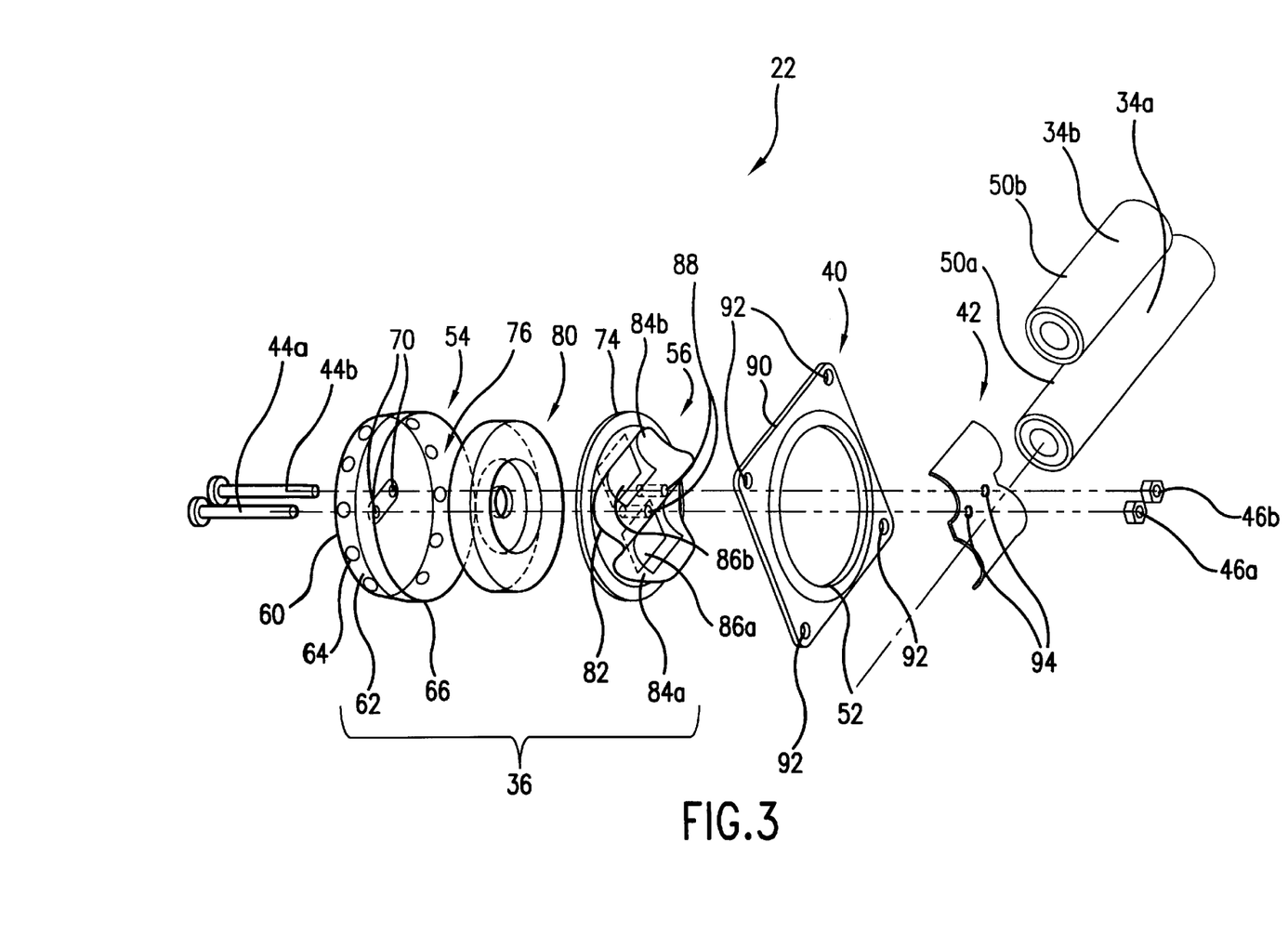
FIG. 3 is a partially exploded simplified perspective schematic view of an inflation assembly in accordance with one embodiment of the invention and such as included in the airbag module assembly illustrated in FIGS. 1 and 2.

The inflation system 22, as shown in FIGS. 1–3, includes first and second gas-supplying cartridges, 34a and 34b, respectively, also sometimes referred to herein as first and second stages. The inflation system 22 also includes a diffuser element 36, a mounting flange 40, a clamp bracket 42, first and second attachment bolts 44a and 44b, and corresponding first and second attachment fasteners 46a and 46b such as in the form of attachment nuts, adapted to be fittingly engaged with an associated attachment bolt 44a and 44b and thereby secure the first and second gas-supplying cartridges 34a and 34b between the diffuser element 36 and the clamp bracket 42.

The gas-supplying cartridges 34a and 34b each have a generally cylindrical shape or form, e.g., cross sectional contour. It will be understood, however, that the broader practice of the invention is not necessarily limited to gas-supplying cartridges of such or any other particular shape, form or contour.

The gas-supplying cartridges 34a and 34b are each adapted to provide an associated and corresponding inflation medium. As will be appreciated, the gas-supplying cartridges or stages 34a and 34b can be designed and controlled, such as in a known manner, to provide a wide range of performance capabilities. Dependent on the specific circumstances of the event leading to the need to deploy the airbag cushion 24, the gas-supplying cartridges or stages 34a and 34b can be actuated in a correspondingly appropriate manner such as to provide specifically desired inflation performance. For example, the inflation system 22 may be operated such that only a selected one of the gas-supplying cartridges or stages 34a and 34b is actuated. Alternatively, if the specific circumstances call for both of the gas-supplying cartridges or stages 34a and 34b to be actuated, such actuation can be effected simultaneously or sequentially, with or without a selected time delay between the production of gas output from the respective gas-supplying cartridges or stages 34a and 34b. Further, those skilled in the art will appreciate that the inflation medium outputs from the first and second gas-supplying cartridges or stages 34a and 34b can also or alternatively be at such different quantities or rates as may be desired to provide additionally desired performance flexibility.

Various types of gas-supplying cartridges are known in the art including those which derive an inflation medium, e.g., inflation gas, from a combustible pyrotechnic gas-forming material, as well as those containing a compressed stored gas and hybrids thereof, for example. While various of such and other known types or kinds of gas-supplying cartridges can be used in the practice of the invention, the invention is believed to have particular initial utility in connection with pyrotechnic-based gas-supplying cartridges. While the specific construction of particular gas-supplying cartridges for use in the practice of the invention will be described in greater detail below, the gas-supplying cartridges 34a and 34b, upon actuation in accordance with the invention, each discharge or otherwise provide inflation medium from along the discharge side or section 50a and 50b (shown in FIG. 2), respectively, of the respective gas-supplying cartridge 34a and 34b, through the mounting flange 40, specifically the inner annular opening 52 thereof, and into the diffuser element 36.

The diffuser element 36, as perhaps best seen by reference to FIG. 3, is a generally toroidal shaped component formed by a cap 54 and a base 56. The diffuser cap 54 is generally dish-shaped and includes a circular topwall 60, a cylindrical sidewall 62 defining a plurality of outlet openings 64 and an open circular bottom 66. The cap topwall 60 includes one or more attachment openings 70 each adapted to receive an associated attachment bolt 44a and 44b. The diffuser base 56 has a generally circular perimeter 74 sized to correspond to the cap circular bottom 66.

As will be appreciated, the broader practice of the invention is not generally limited by the specific form or shape of the components of the diffuser element as, for example, non-circular cross section components can, if desired, be used. Further, the diffuser cap 54 and base 56 can be joined in any appropriate manner. For example, such joinder can be effected by crimping an end region of the cap sidewall 62 about the base perimeter 74.

As shown in FIG. 3, the diffuser element 36 generally defines an internal volume 76. If desired, the internal volume 76 can be left unoccupied and may simply serve as a conduit for the passage of inflation medium from one or more of the associated gas-supplying cartridges 34a and 34b to the associated airbag cushion 24. Alternatively, at least a portion of the diffuser internal volume 76 may, as shown in FIG. 3, house or contain a selected coolant medium 80, such as effective to at least partially cool inflation media coming into contact or communication therewith and prior to passage thereof into the associated airbag cushion 24.

Various coolant media, such as are known in the art, can desirably be used herein. The gas cooling medium 80 can take various forms such as including either or both mechanical and chemical cooling media as may be desired and particularly suited for specific applications of the invention. For example, an inflation system in accordance with the invention may incorporate a mechanical cooling medium such as in the form of one or more of a rolled screen such as of heat conductive metal (e.g., steel or copper), expanded metal, thermal ceramic paper and woven wire mesh. Such mechanical cooling media typically desirably have a relatively high thermal conductivity as well as large surface area and mass with which to absorb heat and thus may serve as a heat sink. In practice, however, various factors may serve or act to control or limit the amount of cooling which may be realized through the use of such mechanical cooling means. For example, the amount of cooling realizable through such use of a mechanical cooling means will typically be limited by factors such as the length of time the generated gas is in contact with the cooling media as well as the physical properties or parameters, such as mass, surface area, melt temperature and thermal conductivity of the cooling media.

Thus, in accordance with certain preferred embodiments of the invention, a relatively light weight mechanical cooling medium which does not significantly adversely affect assembly weight yet provides a dramatic decrease in temperature and thus pressure of the gas issuing forth from the assembly without detrimentally reducing the moles or volume of gas is beneficially utilized. The utilization of such a mechanical cooling medium though desirably creating a tortuous path for the passage of the hot gas exiting from the gas-supplying cartridge preferably does not choke gas flow to an extent that would adversely affect the speed of deployment of the associated inflatable cushion or the volume of gas provided to result in desired occupant protection.

Alternatively or in addition to the incorporation of such a mechanical cooling medium, inflation systems in accordance with the invention may rely on the chemical cooling of generated gases. Chemical cooling of generated gases in accordance with one preferred embodiment of the invention utilizes one or more endothermically reactable chemical coolant materials with which hot generated gases come into contact such that the hot generated gases are cooled. As will be appreciated, various chemical coolant materials are known and are available for use in the practice of the invention including, for example, various metal carbonates. Magnesium carbonate is one common metal carbonate useful in such applications. The broader practice of the invention, however, is not limited by the specific chemical coolant selected and used therein.

Moreover, it will be appreciated that, if desired, the invention can be practiced using variously shaped and sized forms of chemical coolant. For example, the chemical coolant used in the broader practice of the invention can be in the form of tablets, pellets, crystals or the like as well as various forms or shapes including various extruded forms including cylindrical perforated solids, e.g., solids which include a cylindrical bore such that the coolant solids generally tubular in shape or form.

In addition to providing cooling of hot generated gases which come into contact therewith, at least certain of such chemical coolant materials may advantageously produce or form additional gaseous products upon contact with and cooling of the hot generated gases and such as may be used to supplement the gaseous inflation products issuing forth from the associated inflation system.

The diffuser base 56, includes a raised face 82 which forms a first cartridge accepting section 84a adapted to accept the first gas-supplying cartridge 34a in inflation medium communicating relationship therewith. More specifically, the discharge side or section 50a is generally positioned in register with a first opening 86a in the base 56.

Similarly, the raised base face 82 also forms a second cartridge accepting section 84b adapted to accept the second gas-supplying cartridge 34b in inflation medium communicating relationship therewith. More specifically, the discharge side or section 50b is generally positioned in register with a second opening 86b in the base 56.

The mounting flange 40 is generally fixed adjacent the diffuser base 56 between the diffuser base 56 and the first and second gas-supplying cartridges 34a and 34b, respectively. The mounting flange 40 can be variously sized and shaped such as to satisfy the installation particulars of a particular inflatable restraint system installation. Further, in a preferred practice of the invention, as such a mounting flange is a separate component part of the assembly, the use of a particularly sized or shaped mounting flange can be appropriately incorporated into an assembly in accordance with the invention without necessitating changes in the design or fastening of other components of the assembly. Thus, the same or similar manufacturing or assembly equipment and techniques can be applied to inflation assemblies and systems of possible widely varying performance capabilities. The ability to simply produce or assemble inflation systems of selected performance capabilities is a key feature of the subject invention.

In the illustrated embodiment, the mounting flange 40 has an outer perimeter 90 in the general form of a square with rounded corners. The mounting flange 40 forms an inner annular opening 52 adapted to accept the diffuser element raised base face 82. The mounting flange 40 may, as shown, include a plurality of attachment openings 92 such as generally adapted to facilitate and permit attachment of the inflation system 22 either as a part of a module assembly or in a vehicle itself such as to the hub of the steering wheel, in the case of a driver side installation.

As identified above, the inflation system 22 additionally includes the clamp bracket 42 such as helpful in securing the first and second gas-supplying cartridges 34a and 34b, respectively, in and to the system 22 and the module assembly 20. The clamp bracket 42 includes one or more attachment openings 94 each adapted to receive an associated one of the attachment bolts 44a and 44b.

Returning to FIG. 2, the airbag cushion 24 of the illustrated embodiment is of generally known construction and includes an inflation medium inlet opening, generally designated by the reference numeral 96 wherethrough the inflation fluid from the inflation system 22 enters the airbag cushion 24 to effect the inflation thereof.

The cushion assembly retention system or assembly 26 includes an annular-shaped retaining ring 100 is located within the airbag cushion 24 just within the inlet opening 96. Bolts 102 or the like are passed through the retaining ring 100, the airbag cushion 24, the module housing 30 and the inflation system mounting flange 40, e.g., a corresponding one of the attachment openings 92, shown in FIG. 3 and are fastened with nuts 104 or the like to secure the airbag cushion 24, the mounting flange 40 and the inflation system 22 in the module assembly 20.

It will be understood by those skilled in the art and guided by the teachings herein provided that through the selection of gas-supplying cartridges for providing an inflation medium of desired quantity, at desired rates and at desired points in time, a wide range of performance capabilities can be provided via inflation systems and assemblies in accordance with the invention. Further, the invention is capable of being practiced in alternative forms such as may desirably simplify one or more of the manufacture, assembly or operation of such inflation assemblies or systems as well as associated airbag module assemblies.

Figure 4:
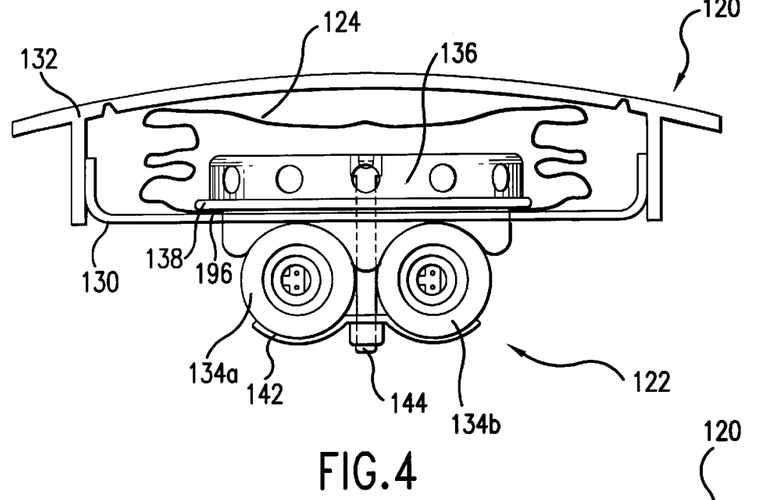
FIG. 4 is an end view, partially in section, of an airbag module assembly in accordance with another preferred embodiment of the invention.
Figure 5:
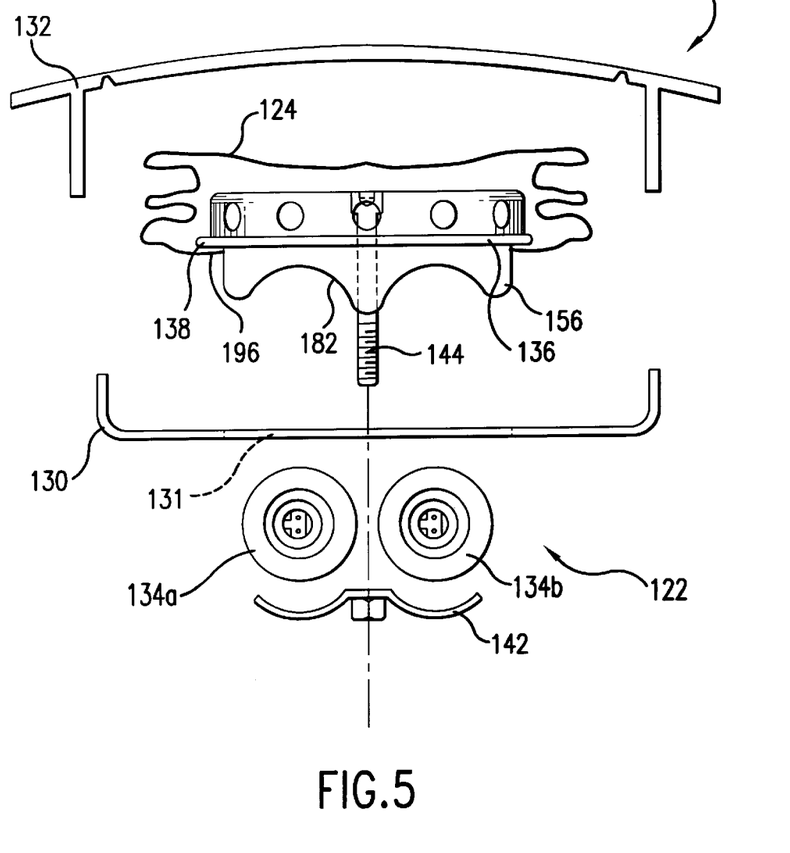
FIG. 5 is a partially exploded end view, partially in section, of the airbag module assembly shown in FIG. 4.

For example, FIGS. 4 and 5 illustrate an airbag module assembly, generally designated by the reference numeral 120, in accordance with one such preferred alternative embodiment of the invention. Similar to the airbag module assembly 20 described above, such an airbag module assembly is commonly housed in or secured to any appropriate cooperating portion of the vehicle. In the case of a driver side module installation, such as illustrated, such an assembly is typically housed in or secured to the steering wheel (not shown).

The module assembly 120 is also similarly formed of major components including an inflation system, generally designated by the reference numeral 122, airbag cushion 124, a module housing 130, having a generally annular base opening 131, and a module cover 132. As in the above-described embodiment, the module cover 132 is securable to the module housing 130, such as in a known manner, to enclose the stored airbag cushion 124 prior to actuation of the inflatable restraint system.

Figure 6:
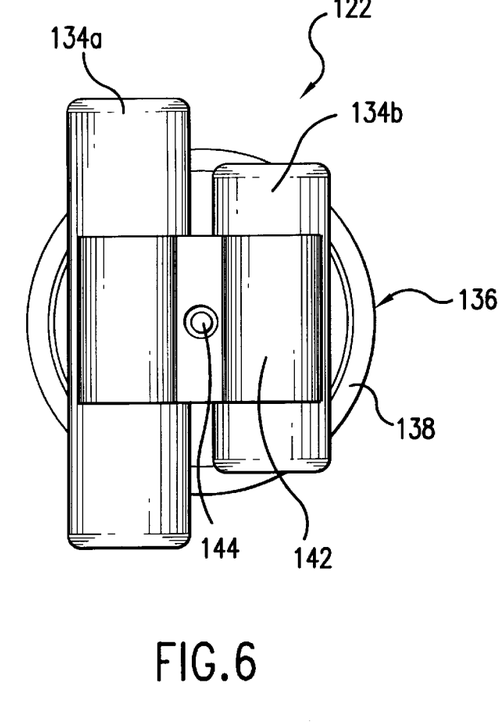
FIGS. 6–8 are bottom, side and end views of an inflation assembly in accordance with one embodiment of the invention.
Figure 7:
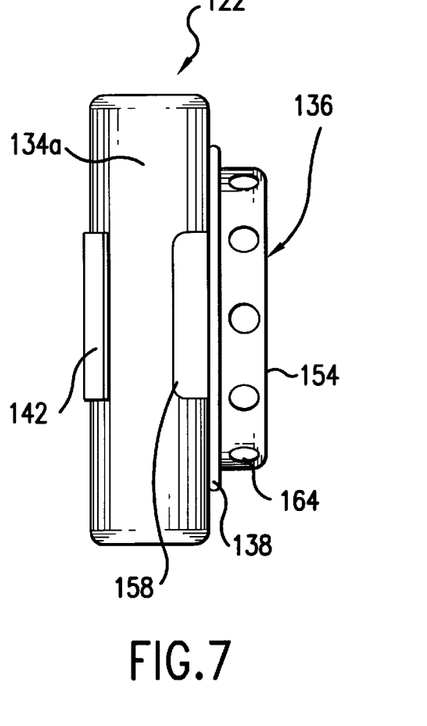
Figure 8:
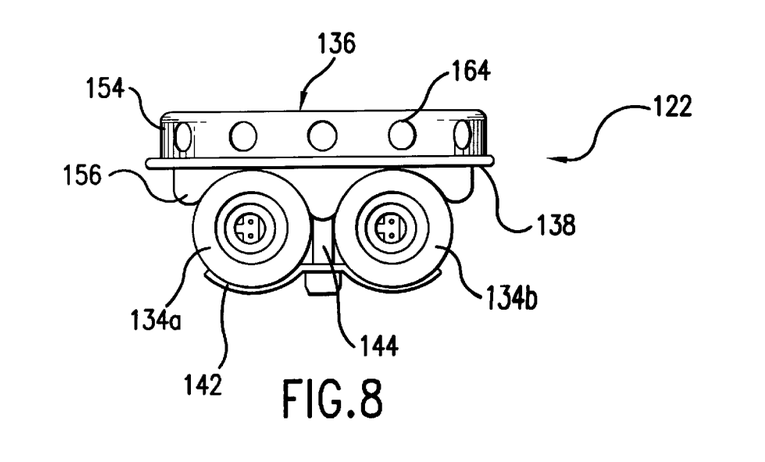
Figure 9:
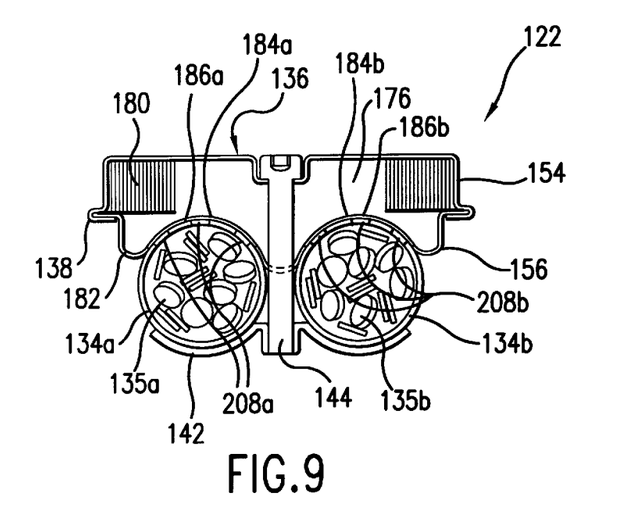
FIG. 9 is an end view, partially in section, of the inflation assembly shown in FIG. 6–8.

The inflation system 122 is shown in greater detail in FIGS. 6–9. FIGS. 6–8 are simplified bottom, side and end views of the inflation assembly 122 while FIG. 9 is an end view, partially in section, of the inflation assembly 122. In FIGS. 6–9, the inflation assembly 122 is shown in simplified form, without the associated airbag cushion 124, module housing 130 and module cover 132 in order to facilitate illustration, discussion and comprehension.

The inflation system 122 includes first and second gas-supplying cartridges, 134a and 134b, respectively. The gas-supplying cartridges 134a and 134b each contain a quantity of a selected gas generant material, designated by the reference characters 135a and 135b, respectively, and such as shown in FIG. 9 in the form of pyrotechnic gas generant pellets. As will be appreciated, gas generant materials used in the practice of the invention can be of a pyrotechnic composition or other suitable material such as known in the art. It will be understood that gas generant material in the gas-supplying cartridges 134a and 134b can be the same or different composition, shape, size or form, as may be desired in a particular application.

The inflation system 122 further includes a diffuser element 136 (such as forms a collar 138), a clamp bracket 142, and an associated attachment bolt 144. The attachment bolt 144 and clamp bracket 142 cooperate to secure the first and second gas-supplying cartridges 134a and 134b between the diffuser element 136 and the clamp bracket 142. While the inflation system 122 shown in FIGS. 4–9 is shown with only a single attachment bolt 144 and such single bolt attachments can be used, the use of two spaced apart attachment bolts, such as shown relative to the inflation system 22 shown in FIGS. 1–3, has been found generally preferable as better assuring the maintenance of proper attachment over the various possible actuation scenarios which may be employed therewith.

As perhaps best viewed by reference to FIGS. 8 and 9, the diffuser element 136, includes a cap 154 and a base 156.

As shown in FIG. 9, the diffuser element 136 generally defines an internal volume 176. The internal volume 176 houses or contains a selected coolant medium 180, such as effective to at least partially cool inflation media coming into contact or communication therewith and prior to passage thereof into the associated airbag cushion. In FIG. 9, the coolant medium 180 is in the form of a metal screen mesh. As will be appreciated, such metal screen mesh can function as a heat sink effective to at least partially cool materials coming into contact therewith. Other coolant mediums, alone or in combination may also be used and included in the diffuser element 136.

Alternatively, as described above, the internal volume 176 may if desired be left unoccupied and may serve as a conduit for the passage of the inflation medium from one or more of the associated gas-supplying cartridges 134a and 134b. In practice, at least some cooling of an inflation medium would be associated with the passage of the inflation fluid through such a conduit.

As shown in FIGS. 7 and 8, the diffuser cap 154 includes a plurality of outlet openings 164 wherethrough inflation fluid can be emitted into fluid communication with an associated inflatable vehicle occupant restraint (e.g., airbag cushion). As shown in FIG. 9, the diffuser base 156 includes a raised face 182 which, as described in greater detail below, forms a first cartridge accepting section 184a having a first opening 186a and a second cartridge accepting section 184b having a second opening 186b. The first cartridge accepting section 184a is adapted to accept the first gas-supplying cartridge 134a and the second cartridge accepting section 184b is adapted to accept the second gas-supplying cartridge 134b in inflation medium communicating relationship therewith.

As in the above-described embodiment, the gas-supplying cartridges 134a and 134b are each adapted to provide an associated and corresponding inflation medium in a selected or desired quantity, and/or at a particularly selected point in time, such as described above.

Returning to FIGS. 4 and 5, one significant difference of the airbag module assembly 120 relative to the airbag module assembly 20 described above relates to the manner or technique by which the airbag cushion is therein held or retained. More specifically, the module assembly 120 serves to generally hold or retain the associated airbag cushion 124 via the cooperation of particular component parts of the assembly without requiring the inclusion of particular cushion attachment fasteners. In particular, the airbag cushion 124 forms an inlet opening 196 with at least a portion of the diffuser element 136 positioned therewithin such that the cushion inlet opening 196 is fitted about the diffuser element collar 138. As shown, in the final assembly, the cushion inlet opening 196 is trapped or held directly between the diffluser element 136 and the module housing 130 without the need for specific airbag cushion attachment or retaining fasteners or features, such as retaining rings, as are commonly utilized in association with conventional cushion retention arrangements. To that end, the module housing base opening 131 is generally sized and shaped to receive the raised face 182 of the diffuser base 156.

Further, as the airbag module assembly 120 does not incorporate a mounting flange, as in the module assembly 20 described above, other means or techniques for the mounting or attachment of the module assembly within a vehicle, such as are known in the art, may be used for the mounting or attachment thereof.

Figure 10:
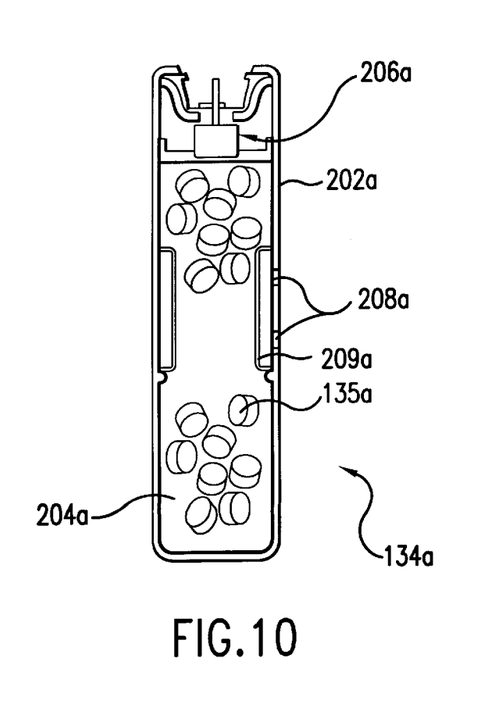
FIGS. 10 and 11 are side view, partially in section, of the first and second gas-supplying cartridges of the inflation assembly shown in FIGS. 4–9.
Figure 11:
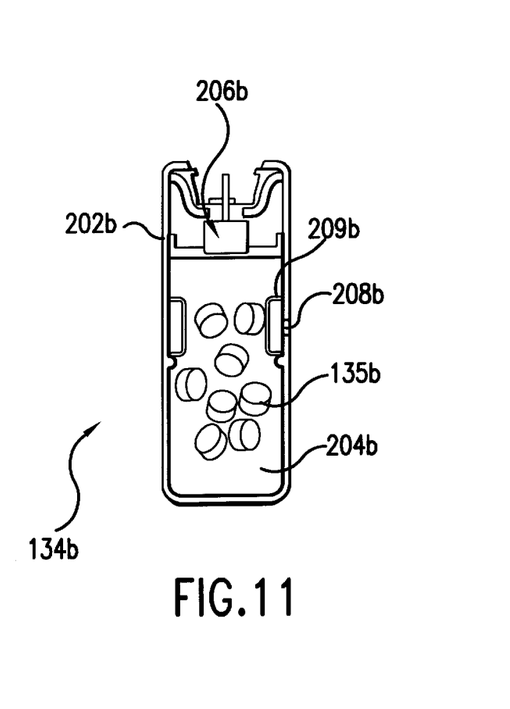

To further understanding of the invention, reference is now made to FIGS. 10 and 11 which are side views, partially in section, of the first and second gas-supplying cartridges, 134a and 134b, respectively.

Each of the gas-supplying cartridges 134a and 134b includes a housing 202a and 202b, respectively, having a generally cylindrical shape or form, such as is common for such gas-supplying cartridges. It will be understood, however, that the broader practice of the invention is not necessarily limited to gas-supplying cartridges with housings of such or any other particular shape or form.

Each of the cartridge housing 202a and 202b forms a chamber 204a and 204b, respectively. The chambers 204a and 204b each contain a quantity of the selected gas generant material, 135a and 135b, respectively. As will be appreciated, such gas generant materials can be of a pyrotechnic composition or other suitable material such as known in the art. It will be understood that gas generant material in the gas-supplying cartridges 134a and 134b can be the same or different, as may be desired in a particular application.

Each of the gas-supplying cartridges 134a and 134b includes an initiator device 206a and 206b, respectively. Each of the initiator devices 206a and 206b is, upon actuation thereof, in reaction initiating communication with the gas generant material in the associated cartridge chamber to effect the reaction thereof and the production of a corresponding inflation medium.

Each of the cartridge housings 202a and 202b includes at least one and generally several exit orifices wherethrough the associated inflation medium can be discharged. As shown in FIGS. 9–11, the first inflation housing 202a includes the exit orifices 208a, the second inflation housing 202b includes the exit orifices 208b, respectively. As will be appreciated, the specific number and placement of such exit orifices can be selected by one skilled in the art and guided by the teachings herein provided such as in order to provide specifically desired performance characteristics or behavior.

Returning to FIGS. 10 and 11, the gas-supplying cartridges 134a and 134b may additionally contain or house, as shown, a gas generant retainer 209a and 209b, respectively. The inclusion of gas generant retainers such as of known construction may be desired such as to better ensure avoidance of passage of undesirably large solids from the cartridge housing.

As shown in FIG. 9, the first gas-supplying cartridge 136a exit orifices 208a are generally positioned in register with the first base opening 186a and the second gas-supplying cartridge 136b exit orifices 208b are generally positioned in register with the second base opening 186b.

In accordance with a preferred practice of the invention, the inflation medium from each of the first and the second gas-supplying cartridges or stages is, as described in greater detail below, independently throttled, thereby allowing for greater combustion efficiency regardless of the time delay between the actuation of the first and second cartridges or stages. More specifically, each of the first and the second gas-supplying cartridges contains a predetermined or selected amount of gas generant material, e.g., a pyrotechnic gas-forming material. In accordance with the invention, such pyrotechnic material burns to produce or otherwise provide the desired quantity of inflation medium as is appropriate for that particular inflation stage for the particular vehicle application. In accordance with a preferred practice of the invention, pressure control or maintenance is realized through matching the area of the exit orifices of a cartridge to the quantity and characteristics of the charge of pyrotechnic material contained within that particular cartridge. Thus, in accordance with such preferred practice, the combustion efficiency of each cartridge can be optimized to the particular pyrotechnic charge contained therewithin. As a result, the amounts or proportions of various undesirable combustion species, such as carbon monoxide and oxides of nitrogen, can desirably be reduced or limited.

As identified above, inflation systems in accordance with the invention can be designed to provide a wide range of inflation fluid or gas outputs. For example, such performance selectability or tailorability can be achieved, at least in part, through the timing of the production of gas output from the respective gas-supplying cartridges. In addition, the particular gas generant materials used in the respective gas-supplying cartridges may also be individually selected to provide particular performance characteristics. A relatively simple and therefor sometimes preferred technique for providing performance within a particularly desired range involves the simple utilization of selected quantity of a particular gas generant material, e.g., pyrotechnic, in each of the gas-supplying cartridges of the inflation system. As the quantity of gas generant material contained within a gas-supplying cartridge is generally a function of the volume and therefor the length thereof, the providing of desired quantities of a gas generant material can generally correspond to the selection of a gas-supplying cartridge of desired length.

Figures 12, 13:
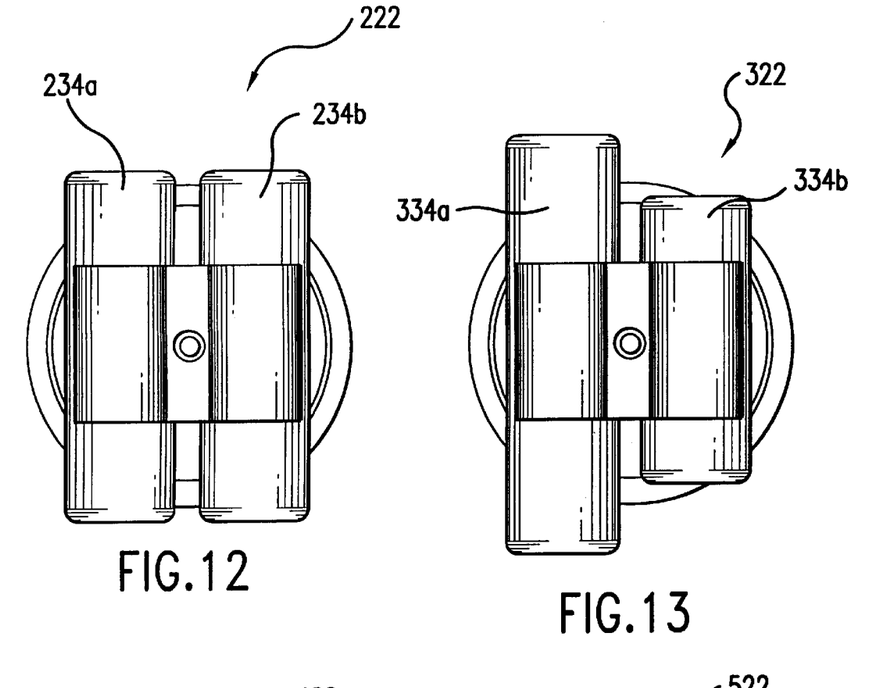
FIGS. 12–15 are simplified bottom views of inflation assemblies, similar to that shown in FIG. 6 and in general accordance with alternative embodiments of the invention.
Figure 14:
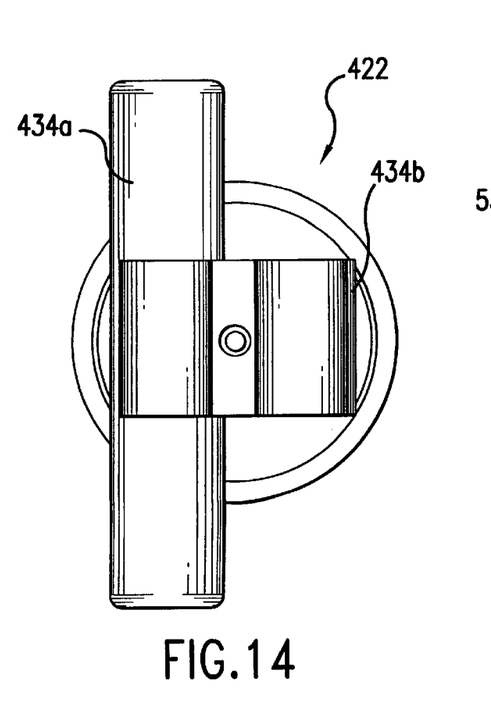
Figure 15:
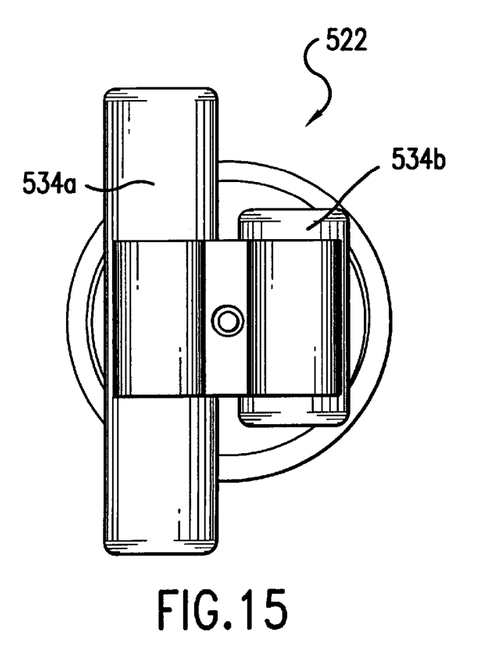

FIGS. 12–15 are simplified bottom views of inflation assemblies, designated by the reference numerals 222, 322, 422 and 522, respectively, each having a particularly sized combination of a first and a second gas-supplying cartridge. More particularly, the inflation assembly 222, shown in FIG. 12, includes a first and a second gas-supplying cartridge, 234a and 234b, respectively, of the same or similar size or gas output. FIG. 13 illustrates the inflation system 322 wherein the first and second gas-supplying cartridges 334a and 334b, respectively, are in a selected ratio, e.g., 60:40. FIGS. 14 and 15 illustrate the inflation systems 422 and 522 wherein the selected ratio of the first gas-supplying cartridge 434a and 534a relative to the second gas-supplying cartridge 434b and 534b is 80:20 and 70:30, respectively. As will be appreciated, the particular ratio can be selected as may be desired to meet the specific requirement of a particular installation.

It is to be appreciated that inflation systems and inflatable restraint module assemblies, such as described above, can provide an ease of tailorability and low cost while maintaining a module mounting arrangement utilizable in various vehicle installations not easily or normally obtainable with conventional system and assembly designs. For example, desired performance flexibility can be provided via the appropriate design and selection of first and second gas-supplying cartridges of design and size. Further, the invention permits and facilitates the use of variously sized gas-supplying cartridges such as may be incorporated to provided particularly desired performance characteristics or behavior.

Thus, the invention provides an adaptive or multistage inflation assembly which readily permits the independent throttling of the inflation medium discharged from each of the stages thereof. The invention further provides inflatable restraint system installations and, more specifically, inflation assemblies which more readily permit either or both design specificity and tailorability without necessitating undesirably complicated, costly or time-consuming tooling, manufacturing or production changes in order to provide required design specificity for particular vehicle installations. In particular, the invention provides an adaptive inflation assembly, especially for driver side applications, of simple design and construction and such as may more readily satisfy installation size limitations and vehicle design specificity.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An assembly for providing inflation fluid to an inflatable vehicle occupant restraint, said assembly comprising:
   at least a first gas-supplying cartridge having a first preselected cross sectional contour and forming a first chamber for providing a first inflation medium, the first gas-supplying cartridge including at least one exit orifice wherethrough the first inflation medium can be discharged;
   a diffuser element having a base and a cap, the base forming at least first and second gas-supplying cartridge accepting sections with at least the first gas-supplying cartridge accepting section adapted to accept the first gas-supplying cartridge in first inflation medium communicating relationship, the cap including a plurality of outlet openings wherethrough inflation fluid can be emitted into fluid communication with the inflatable vehicle occupant restraint; and
   means for clamping the first gas-supplying cartridge to the base of the diffuser element.

2. The assembly of claim 1 additionally comprising a second gas-supplying cartridge having a second preselected cross sectional contour and forming a second chamber for providing a second inflation medium, the second gas-supplying cartridge including at least one exit orifice wherethrough the second inflation medium can be discharged, with the second gas-supplying cartridge accepting section adapted to accept the second gas-supplying cartridge in second inflation medium communicating relationship and means for clamping the second gas-supplying cartridge to the base of the diffuser element.

3. The assembly of claim 2 wherein the first and second gas-supplying cartridges supply first and second inflation mediums, respectively.

4. The assembly of claim 3 wherein the first and second gas-supplying cartridges supply first and second inflation mediums, respectively, of different quantities.

5. The assembly of claim 3 wherein the first and second gas-supplying cartridges supply first and second inflation mediums, respectively, at different rates.

6. The assembly of claim 3 wherein the first and second gas-supplying cartridges supply first and second inflation mediums, respectively, at different points in time.

7. The assembly of claim 2 wherein the first inflation medium discharged from the first gas-supplying cartridge is throttled independently from the second inflation medium discharged from the second gas-supplying cartridge.

8. The assembly of claim 1 wherein the first chamber contains a supply of gas generant material which reacts to produce the first inflation medium.

9. The assembly of claim 8 wherein the gas generant material comprises a pyrotechnic gas-forming material.

10. The assembly of claim 1 wherein the diffuser element defines a cooling chamber interposed between the first gas-supplying cartridge accepting section and the plurality of outlet openings.

11. The assembly of claim 10 wherein the cooling chamber contains a selected cooling medium.

12. The assembly of claim 11 wherein the cooling medium is a chemical coolant material.

13. The assembly of claim 12 wherein the cooling medium comprises a mechanical coolant material.

14. The assembly of claim 13 wherein the mechanical coolant material comprises a metal heat sink.

15. The assembly of claim 14 wherein the metal heat sink comprises a plurality of metal screen layers.

16. The assembly of claim 1 wherein the means for clamping the first gas-supplying cartridge to the base of the diffuser element comprises an end piece and fastening means to join the end piece with the diffuser element with the first gas-supplying cartridge between the end piece and the diffuser element.

17. The assembly of claim 1 additionally comprising a second gas-supplying cartridge having a second preselected cross sectional contour and forming a second chamber for providing a second inflation medium, the second gas-supplying cartridge including at least one exit orifice wherethrough the second inflation medium can be discharged, with the second gas-supplying cartridge accepting section adapted to accept the second gas-supplying cartridge in second inflation medium communicating relationship, wherein the means for clamping the first gas-supplying cartridge to the base of the diffuser element comprises an end piece and fastening means to join the end piece with the diffuser element with the first and second gas-supplying cartridges, respectively, between the diffuser element and the end piece.

18. The assembly of claim 1 additionally comprising a mounting flange interposed between the diffluser element and the first gas-supplying cartridge.

19. The assembly of claim 1 in combination with an inflatable vehicle occupant restraint and a module housing, wherein the inflatable vehicle occupant restraint includes an inlet opening secured between the diffuser element and the module housing.

20. An assembly for providing inflation fluid to an inflatable vehicle occupant restraint, said assembly comprising:
   a first gas-supplying cartridge having a first preselected cross sectional contour and forming a first chamber for providing a first inflation medium, the first gas-supplying cartridge including at least one exit orifice wherethrough the first inflation medium can be discharged;
   a second gas-supplying cartridge having a second preselected cross sectional contour and forming a second chamber for providing a second inflation medium, the second gas-supplying cartridge including at least one exit orifice wherethrough the second inflation medium can be discharged;
   a diffluser element having a base, a cap and a cooling chamber therebetween;
   the base forming at least first and second gas-supplying cartridge accepting sections with the first gas-supplying cartridge accepting section adapted to accept the first gas-supplying cartridge in first inflation medium communicating relationship and the second gas-supplying cartridge accepting section adapted to accept the second gas-supplying cartridge in second inflation medium communicating relationship,
   the cap including a plurality of outlet openings wherethrough inflation fluid can be emitted into fluid communication with the inflatable vehicle occupant restraint,
   the cooling chamber containing a cooling medium adapted to accept heat from the first and second inflation medium coming into contact therewith; and
   means for clamping the first gas-supplying cartridge adjacent to the diffuser element base end first gas-supplying cartridge accepting section and the second gas-supplying cartridge adjacent to the diffuser element base end second gas-supplying cartridge accepting section.

21. The assembly of claim 20 wherein the first and second gas-supplying cartridges supply first and second inflation mediums, respectively, of different quantities.

22. The assembly of claim 20 wherein the first and second gas-supplying cartridges supply first and second inflation mediums, respectively, at different rates.

23. The assembly of claim 20 wherein the first and second gas-supplying cartridges supply first and second inflation mediums, respectively, at different points in time.

24. The assembly of claim 20 wherein the first inflation medium discharged from the first gas-supplying cartridge is throttled independently from the second inflation medium discharged from the second gas-supplying cartridge.

25. The assembly of claim 20 additionally comprising a mounting flange interposed between the diffuser element and the first gas-supplying cartridge.

26. The assembly of claim 20 in combination with an inflatable vehicle occupant restraint and a module housing, wherein the inflatable vehicle occupant restraint includes an inlet opening secured between the diffluser element and the module housing.

* * * * *